(12) United States Patent
Wang

(10) Patent No.: US 6,683,530 B1
(45) Date of Patent: Jan. 27, 2004

(54) METHOD AND APPARATUS FOR PERFORMING A FLOATING POINT COMPARE OPERATION

(75) Inventor: Yong Wang, Sunnyvale, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 10/230,899

(22) Filed: Aug. 28, 2002

Related U.S. Application Data

(63) Continuation-in-part of application No. 09/391,769, filed on Sep. 8, 1999.

(51) Int. Cl.[7] .................................................. G06F 7/02
(52) U.S. Cl. ...................... 340/146.2; 708/495; 708/671
(58) Field of Search ...................... 340/146.2; 708/495, 708/671

(56) References Cited

U.S. PATENT DOCUMENTS

| | | | | |
|---|---|---|---|---|
| 4,290,111 A | * | 9/1981 | Dillon | ........................ 708/670 |
| 5,084,834 A | * | 1/1992 | Hartley et al. | ............... 708/707 |
| 5,323,331 A | * | 6/1994 | Schenk et al. | ................. 702/66 |
| 5,655,139 A | * | 8/1997 | Thomson et al. | ........... 708/490 |
| 6,131,106 A | * | 10/2000 | Steele, Jr. | .................... 708/510 |

* cited by examiner

Primary Examiner—Margaret R. Wambach
(74) Attorney, Agent, or Firm—Martine & Penilla, LLP

(57) ABSTRACT

A system, method and apparatus for comparing two floating point numbers is includes choosing a first floating point number and a second floating point number to be compared. The first number is sign extended one bit to create a first sign extended number. The second number is sign extended one bit to create a second sign extended number. The second sign extended number is subtracted from the first sign extended number to determine a subtraction result. The sign bits for said first number and said second number are examined to determine if they are both ones. If the sign bits for the first number and the second number are both ones, the sign bit of the subtraction result is inverted to create a final result. If the sign bit of the final result is a zero, asserting that the first number is greater than or equal to the second number. Alternatively, if the sign bit of the final result is a one, asserting that the first number is less than the second number.

8 Claims, 9 Drawing Sheets

METHOD AND APPARATUS FOR PERFORMING A FLOATING POINT COMPARE OPERATION

CROSS REFERENCE TO RELATED APPLICATIONS

This application is a continuation-in-part of U.S. patent application No. 09/391,769 filed on Sep. 8, 1999 and entitled "Method and Apparatus for Performing a Floating Point Compare Operation," which is incorporated herein by reference in its entirety.

BACKGROUND OF THE INVENTION

1. Field of the Invention

The present invention relates to floating point compare operations. More particularly, the present invention provides a method and apparatus for performing a floating-point compare operation which is significantly faster than in the prior art, and which requires less hardware to implement.

2. Description of the Related Art

Increasing demands for faster computers make it necessary to continually explore new ways to improve the efficiency of operations so that operations are performed as quickly as possible using the least amount of hardware resources such as time, space, etc.

FIG. 1 is a block diagram of a typical prior art central processing unit (CPU) in a computer. Referring to FIG. 1, CPU 10 includes a prefetch and dispatch unit 12, an integer execution unit 14, a floating point unit 16, a memory management unit 18, a load store unit 20, an external cache unit 22, and a memory interface unit 24.

Mathematical operations are typically performed either by the integer execution unit 14 or the floating point unit 16, depending on the type of data being operated on. The present invention is specifically directed at comparing two floating point numbers to determine whether a first floating point number is greater than or equal to the second floating point number, or alternatively whether the first floating point number is less than the second floating point number.

In prior art CPU's, when comparing two floating point numbers, the mantissa and exponent for each of the two numbers are compared separately in different adders. The compare results for each of the mantissa and exponent compares are then combined with sign logic to generate a final comparison result. While prior art methods are suitable for their intended purposes, they require hardware that is complex and slow.

It would therefore be beneficial to provide an apparatus and method for performing floating point compare operations using methods that are performed more quickly than the prior art, and using an apparatus which is less complex than required in the prior art.

Floating-point numbers are typically represented in sections of bits. By way of example a sign of a floating-point number is represented in a sign bit that is the left most bit (most significant bit (MSB)). A "0" value in the sign bit typically represents a positive number and a "1" in the sign bit typically represents a negative number.

The center section of the binary representation of a floating-point number is the mantissa section of the floating-point number. The bits in the mantissa section represent the value or magnitude of the floating-point number, expressed in binary. The mantissa section can be as many bits as are necessary to represent the value or magnitude of the floating-point number.

The right section of the binary representation of a floating-point number is the exponent section of the floating-point number. The bits in the exponent section represent the value or magnitude of the exponent of the floating-point number expressed in binary.

Each of the sections of the digital representation of the floating-point number can have as many bits as necessary. Further, the sections can be different bytes. By way of example, a left most byte (8 bits) can be allocated to the sign bit function. One or more bytes can be allocated to each of the mantissa and exponent sections.

SUMMARY OF THE INVENTION

Broadly speaking, the present invention fills these needs by providing a system, method and apparatus for performing a floating point compare operation. It should be appreciated that the present invention can be implemented in numerous ways, including as a process, an apparatus, a system, computer readable media, or a device. Several inventive embodiments of the present invention are described below.

In one embodiment, a method for comparing two floating point numbers is described, the method includes determining if a first number is less than a second number or alternatively if the first number is greater than or equal to the second number. The method also includes extending the sign bit for each number, subtracting the second number from the first, and inverting the sign bit of the result of the subtraction operation if the sign bits for the first and second numbers are both ones. Finally, the sign bit of the subtraction result is checked to determine whether it is a one. If yes, the first number is less than the second. If no, the first number is greater than or equal to the second.

In one embodiment, a system and method for comparing two floating-point binary numbers includes choosing a first floating point number and a second floating point number to be compared. The first number is sign extended one bit to create a first sign extended number. The second number is sign extended one bit to create a second sign extended number. The second sign extended number is subtracted from the first sign extended number to determine a subtraction result. The sign bits for said first number and said second number are examined to determine if they are both ones. If the sign bits for the first number and the second number are both ones, the sign bit of the subtraction result is inverted to create a final result. If the sign bit of the final result is a zero, asserting that the first number is greater than or equal to the second number. Alternatively, if the sign bit of the final result is a one, asserting that the first number is less than the second number.

In one embodiment, the first and second floating point binary numbers to be compared are in the form of a sign bit as a most significant bit and a magnitude in the remaining bits.

In one embodiment, subtracting the second sign extended number from the first sign extended number to determine a subtraction result can include determining a two's complement of the second sign extended number and adding the two's complement of the second sign extended number to the first sign extended number.

The subtraction result can further include truncating the subtraction result if the sign bit of the first number is equal to the sign bit of the second number and the subtraction result included an overflow bit. The truncated subtraction result is equal to the subtraction result having the overflow bit truncated.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE EXEMPLARY EMBODIMENTS

Those of ordinary skill in the art will realize that the following description of the present invention is illustrative only and not in any way limiting. Other embodiments of the invention will readily suggest themselves to such skilled persons who are familiar with this disclosure.

Figure 1:
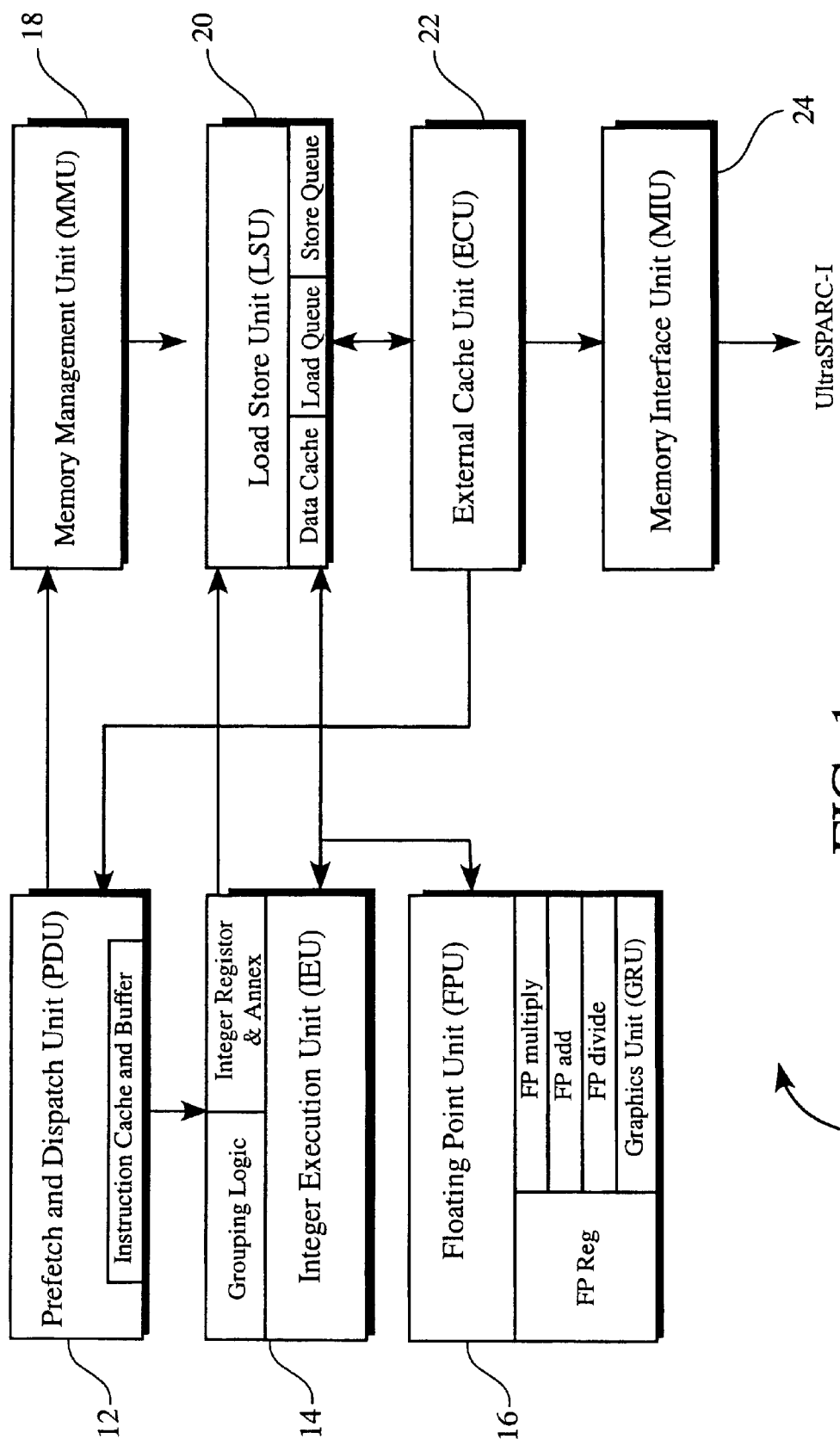
FIG. 1 is a block diagram of a prior art central processing unit.
Figure 2:
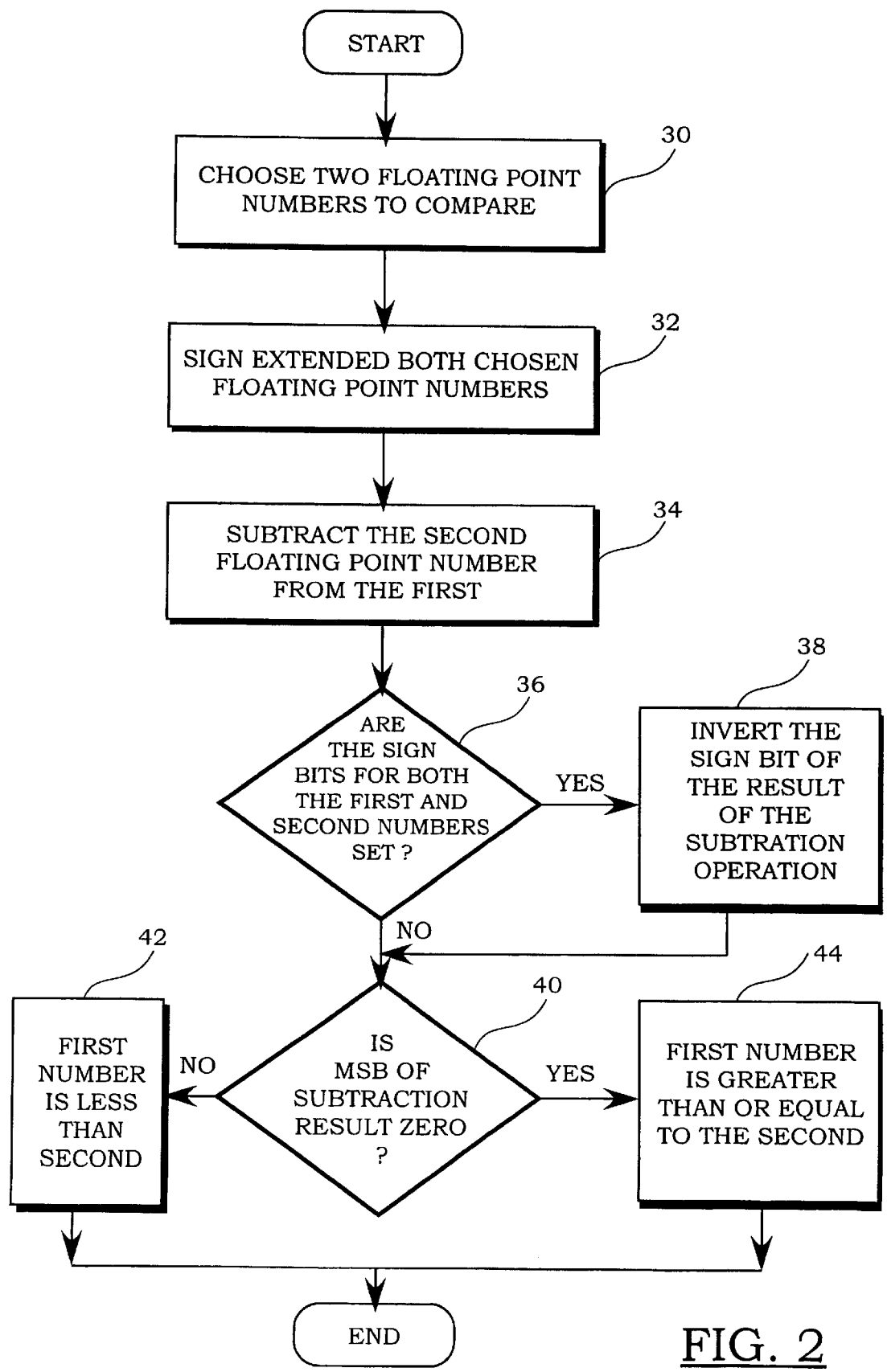
FIG. 2 is a flow chart showing method operations of one embodiment of the present invention.

FIG. 2 is a flow chart showing method operations of one embodiment of the present invention. Referring to FIG. 2, the method begins at operation 30 where a first number and a second number are chosen for comparison. The numbers are then expressed in binary form and expressed in the form as follows:

(sign bit)(magnitude)(exponent)

Where the sign bit is a "1" for negative numbers and a "0" for positive numbers. Bits are typically numbered 0–5 from right to left (i.e., from least significant bit to most significant bit.)

At operation 32, both numbers are sign extended by one bit. Those of ordinary skill in the art are readily aware that the operation of sign extending a number by one bit means that the information in the sign bit for a given binary number is copied to one succeeding bit that is placed to the left of the bits defining the original number.

In a binary number, the leftmost bit is the sign bit. This bit is also often referred to as the most significant bit (MSB). To sign extend a five bit number by one bit means to add one bit to the left of the original five bits (i.e. in the bit 5 position), and copy the information in the previous MSB (i.e., bit 4) to the bit 5 that was just added. The result is that bits 4 and 5 (i.e., the leftmost bits of the resulting number) will be identical ones or zeros and will contain the same binary value as the original sign bit.

At operation 34, the sign extended second number is subtracted from the sign extended first number to form a subtraction result. As is well known in the art, one of the methods of performing a subtraction is by adding the 2's complement of the second number to the first number. The result is the same as a binary subtraction but more easily accomplished in logic circuits. However, in some instances the subtraction result can over flow into an additional bit to the left. If the sign bit of the first number is the same as the sign bit of the second number, and the subtraction result overflows one bit to the left, then the overflow bit must be discarded (i.e., truncated) from the subtraction result and the truncated subtraction result is carried forward to operation 36. If the if the sign bit of the first number is not the same as the sign bit of the second number, then the subtraction result is carried forward to operation 36.

At operation 36, the sign bit for the first number and sign bit for the second number are examined. The sign bits of either the original numbers or the sign extended numbers may be examined, since the sign bits of the original numbers are identical to the sign bits of the sign extended numbers. If the sign bits of the first and second numbers are both "1" (i.e. "set"), the sign bit of the subtraction result (or truncated subtraction result, as applicable) is inverted in operation 38 and the result is output as a final result and the method operations continue in operation 40 below. Thus, if the sign bit of the subtraction result is a "1", then it is inverted to a "0". Conversely, if the sign bit of the subtraction result is a "0", then it is inverted to be a "1". If, however, either of the sign bits of the first and second numbers are "0", then the subtraction result is output as the final result and the method operations continue in operation 40 below.

At operation 40, the sign bit of the final result is examined. If the sign bit of the final result is "1", then in operation 42, the first number is designated as being less than the second number and the method operations end. If, in operation 40, the sign bit of the final result is "0", then, in operation 44 the first number is designated as being greater than or equal to the second number and the method operations end.

Figure 3:
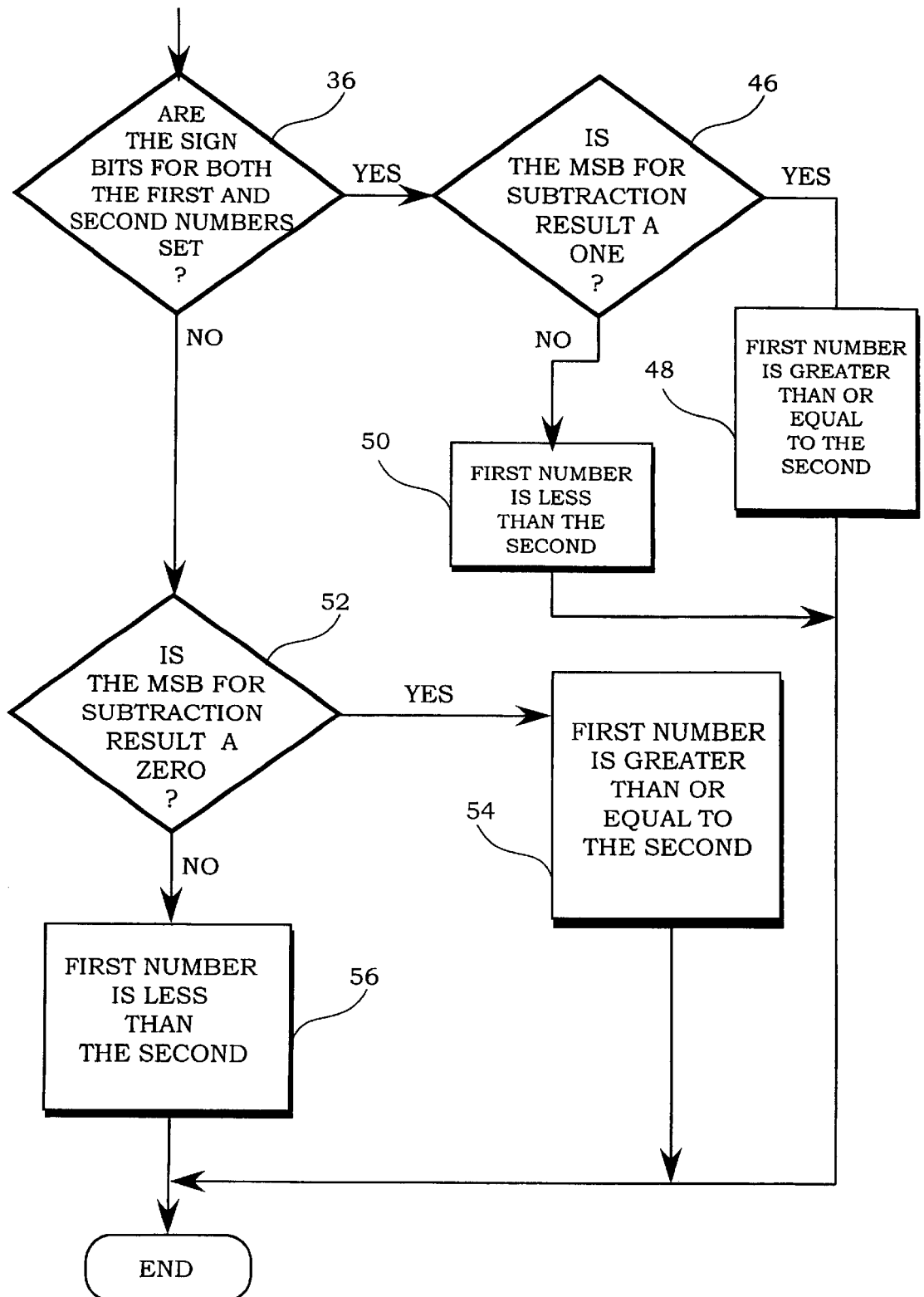
FIG. 3 is a flow chart showing an alternative method operations of one embodiment of the present invention.

An alternative method contemplated by the inventor replaces operations 38 through 44 with operations 46 through 56 as shown in FIG. 3. All operations prior to operation 38 remain the same.

Referring to FIG. 3, if, at operation 36, the sign bits for the first and second numbers are both ones, the method proceeds with operation 46 where it is determined whether the sign bit for the first result is a one. If the sign bit for the subtraction result is a one, the method asserts, in operation 48, that the first number is greater than or equal to the second number. If the sign bit for the subtraction result is not a one, the method asserts, in operation 50, that the first number is less than the second number.

If, at operation 36 of FIG. 3, the sign bit for either of the first or second numbers are zero, the method proceeds with operation 52 where it is determined whether the sign bit for the subtraction result is a zero. If the sign bit for the subtraction result is a zero, the method asserts, at operation 54, that the first number is greater than or equal to the second number. If the sign bit for the subtraction result is not a zero, the method asserts, at operation 56, that the first number is less than the second number.

Figure 4:
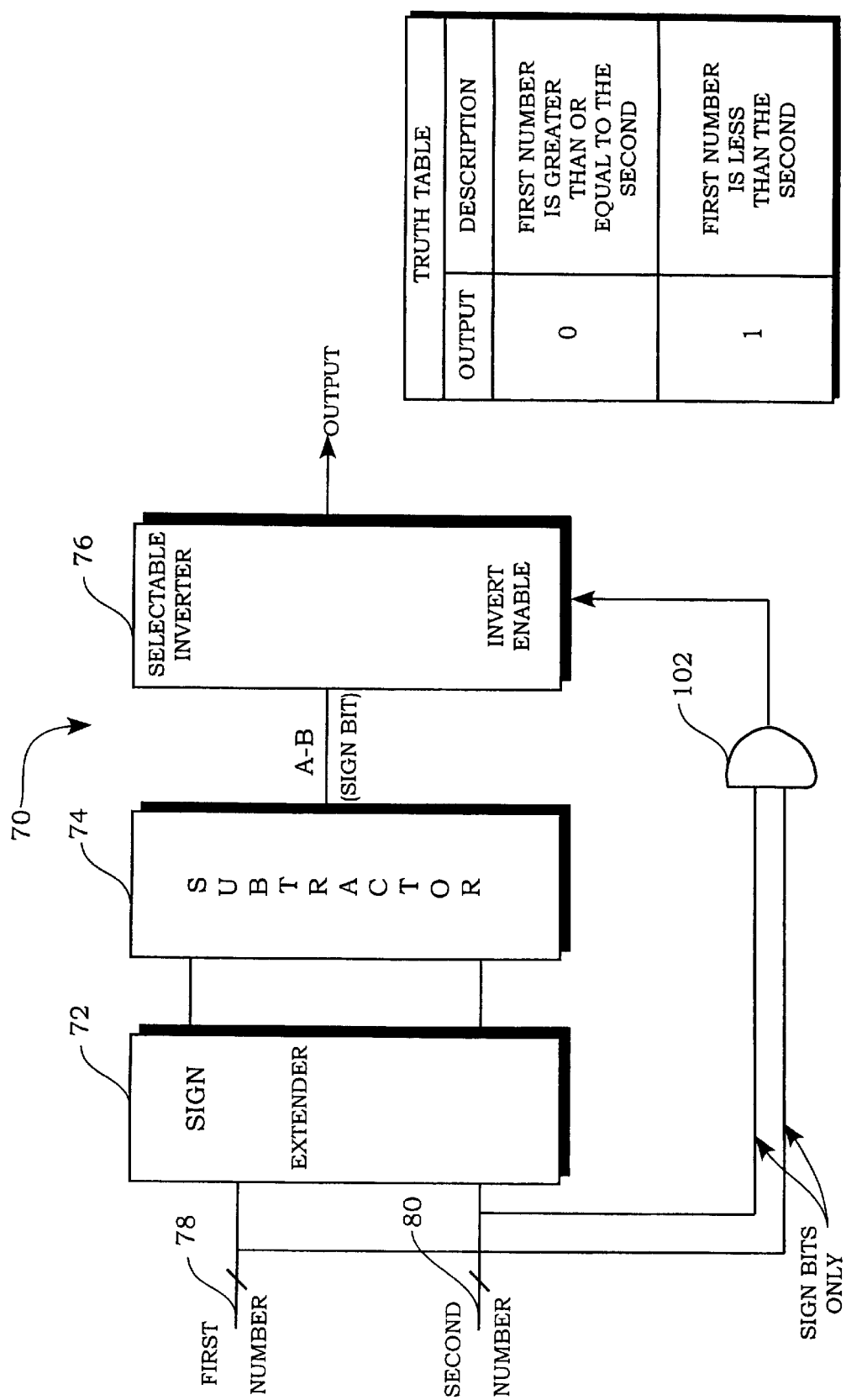
FIG. 4 is a block diagram showing an apparatus for performing the method operations of FIG. 2, according to one embodiment of the present invention.

FIG. 4 is a block diagram showing an apparatus for performing the method of FIG. 2, according to one embodiment of the present invention. Referring to FIG. 4, system 70 includes a sign extender 72, a subtractor 74, and a selectable inverter 76. Sign extender 72 has inputs 78 and 80 that are the first and second numbers being compared as parallel inputs. Sign extender 72 performs the necessary action of extending the width of the first and second numbers, by adding one or more bits to the leftmost bit position (the MSB position) and copying the information in the respective sign bit into each added bit.

Figure 5:
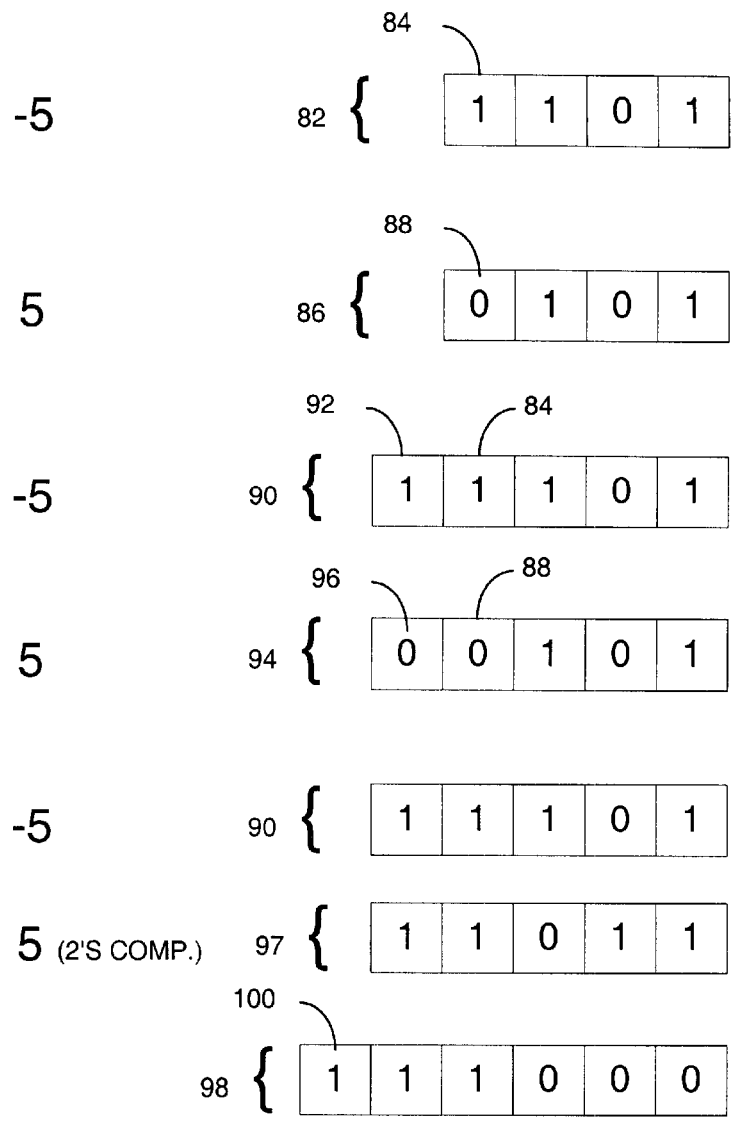
FIG. 5 shows bitwise operations performed according to one embodiment of the method operations of FIG. 2.

One embodiment of the sign extension action is depicted in FIG. 5. A first number 82 has a sign bit 84, and a second number 86 has a sign bit 88. Following a one-bit sign extension, the first number 82 is now number 90 having sign extension bit 92 which is identical in value to sign bit 84. Correspondingly, the second number 86 is now number 94 having sign extension bit 96 which is identical in value to sign bit 88.

Referring again to FIG. 4, subtractor 74 subtracts the second number from the first, producing a subtraction result. One embodiment of the method of the present invention only requires that the sign bit of the subtraction result be kept. However, the entire result is seen in FIG. 5 where result 98 has sign bit 100. Selectable inverter 76 is caused to invert sign bit 100 only if the sign bits 84, 888, respectively, of the first number 82 and the second number 86 are both ones. In one embodiment, this selectable function is performed in FIG. 4 by AND gate 102. The output of AND gate 102 is high only when sign bits 84 and 88 are both ones. Therefore, in the example of FIG. 5, the output of AND gate 102 is low.

In one embodiment, selectable inverter 76 provides an inverted output when the output of AND gate 102 is high. At all other times, the output of selectable inverter 76 follows its input.

If the output of selectable inverter 76 is a zero (or a logical low), the first number is greater than or equal to the second number. If the output of selectable inverter 76 is a logical high, the first number is less than the second number. In the example of FIG. 5, no inversion of the sign bit of the subtraction result 98 would take place, since sign bit 88 is low in the extended second number 94. Thus, since sign bit 100 is a one, the first number is less than the second number.

Figure 6:
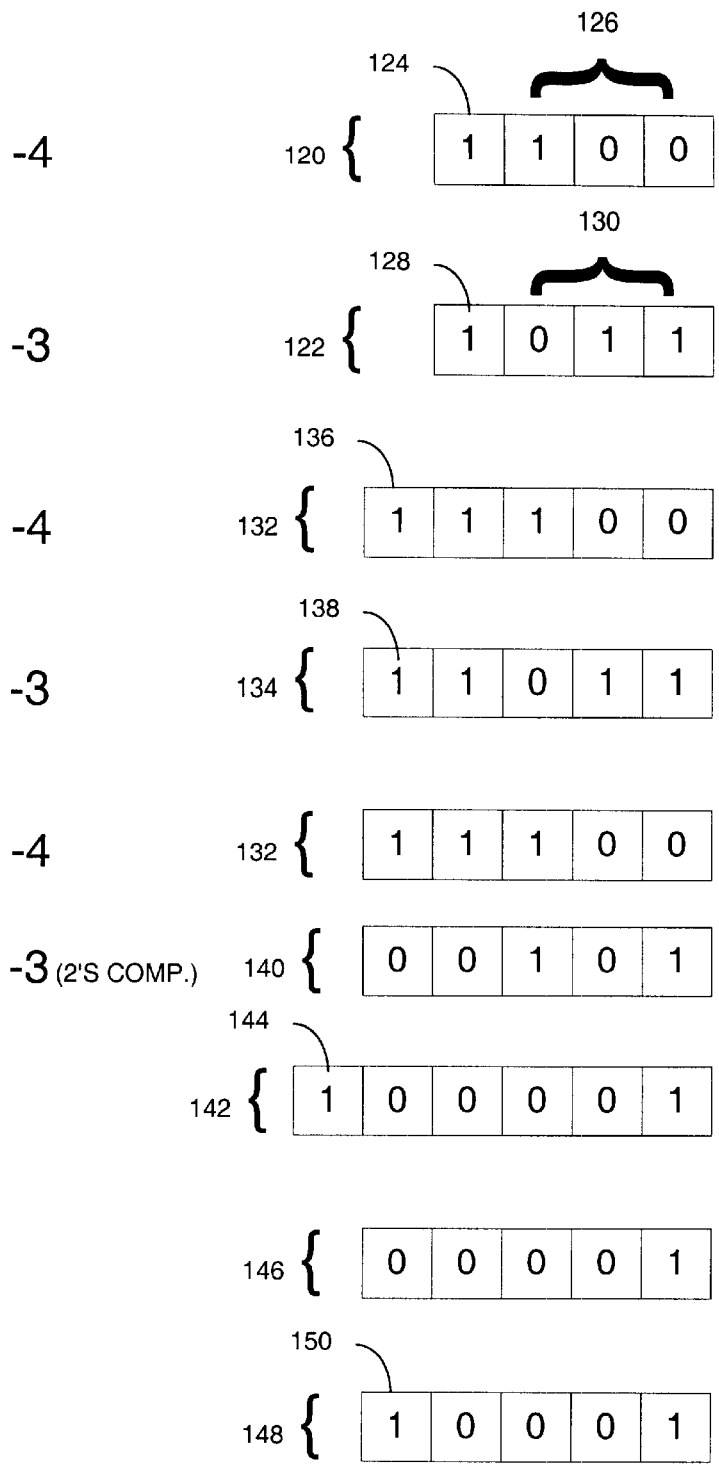
FIGS. 6–9 illustrate several additional examples of numbers to be compared according to at least one embodiment of the present invention.

FIGS. 6–9 illustrate several additional examples of numbers to be compared according to at least one embodiment of the present invention. FIG. 6 illustrates a first number –4 and a second number –3 and the respective binary expressions 120, 122. The binary expression 120 includes a sign bit 124 with a value of "1" to indicate that the first number is a negative number, and a mantissa 126 that includes the value "100" (i.e. 4). Similarly, the binary expression 122 includes a sign bit 128 with a value of "1" to indicate that the second number is a negative number, and a mantissa 130 that includes the value "011" (i.e. 3). Next, the binary expression 120, 122 are sign extended one bit (bits 136, 138 respectively) to create extended binary expressions 132, 134. The sign extended second number 134 is then subtracted from the sign extended first number 132. As described above the subtraction is accomplished by adding the 2's complement 140 of the sign extended second number 134 to the sign extended first number 132. A subtraction result 142 is created. The subtraction result 142 includes an overflow bit 144 which is then truncated because the sign bits 124 and 128 are equal, to create a truncated subtraction result 146. The MSB of the truncated subtraction result 146 is inverted because both sign bits 124 and 128 are equal to "1". The inverted MSB 150 has the value of "1" which indicates that the first number (i.e., –4) is less than the second number (i.e., –3), which is a true statement.

Figure 7:
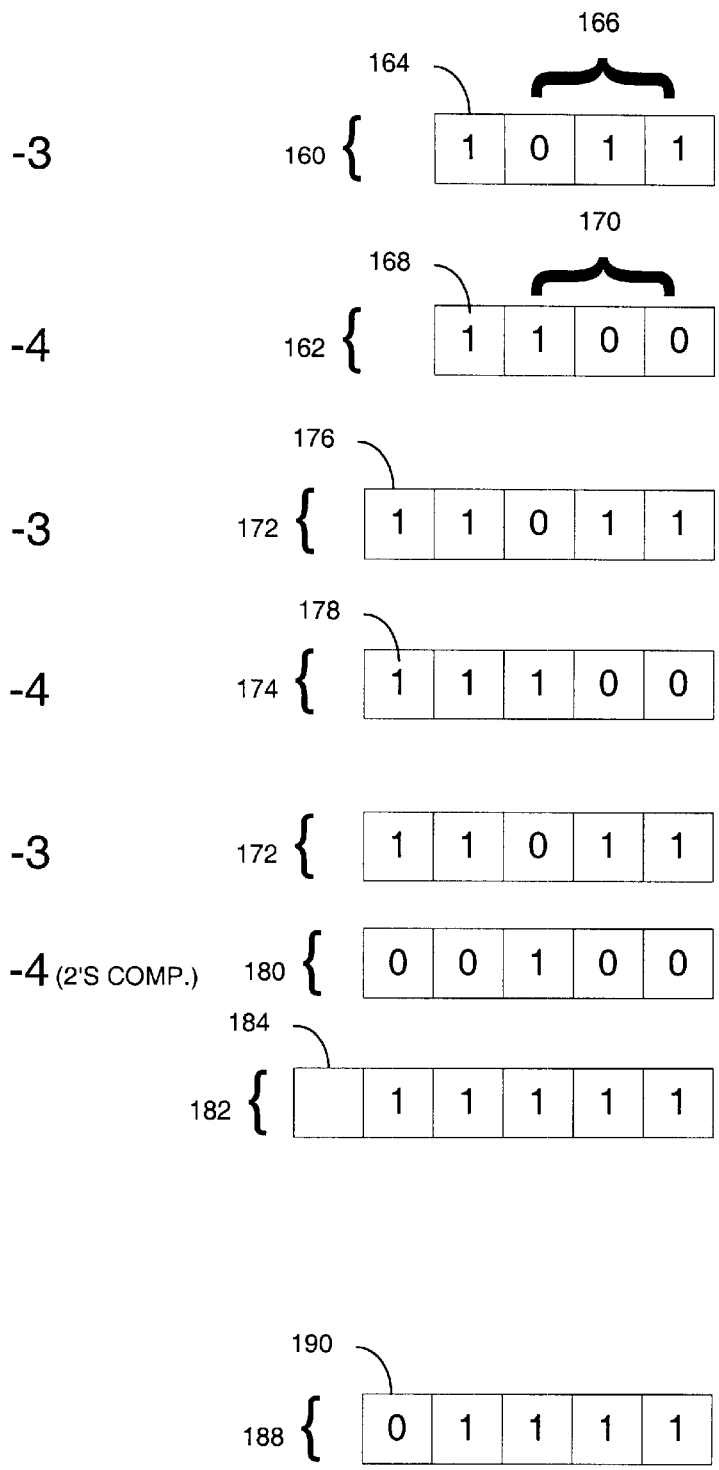

FIG. 7 shows another example according to one embodiment of the present invention. FIG. 7 illustrates a first number –3 and a second number –4 and the respective binary expressions 160, 162. The binary expression 160 includes a sign bit 164 with a value of "1" to indicate that the first number is a negative number, and a mantissa 166 that includes the value "011" (i.e. 3). Similarly, the binary expression 162 includes a sign bit 168 with a value of "1" to indicate that the second number is a negative number, and a mantissa 170 that includes the value "100" (i.e. 4). Next, the binary expression 160, 162 are sign extended one bit (bits 176, 178 respectively) to create extended binary expressions 172, 174. The sign extended second number 174 is then subtracted from the sign extended first number 172. As described above the subtraction is accomplished by adding the 2's complement 180 of the sign extended second number 174 to the sign extended first number 172. A subtraction result 182 is created. The subtraction result 182 does not include an overflow bit 184, which is therefore not truncated even though the sign bits 164 and 168 are equal. The MSB of the subtraction result 182 is inverted because both sign bits 164 and 168 are equal to "1". The inverted MSB 190 has the value of "0" which indicates that the first number (i.e., –3) is greater than or equal to the second number (i.e., –4), which is a true statement.

Figure 8:
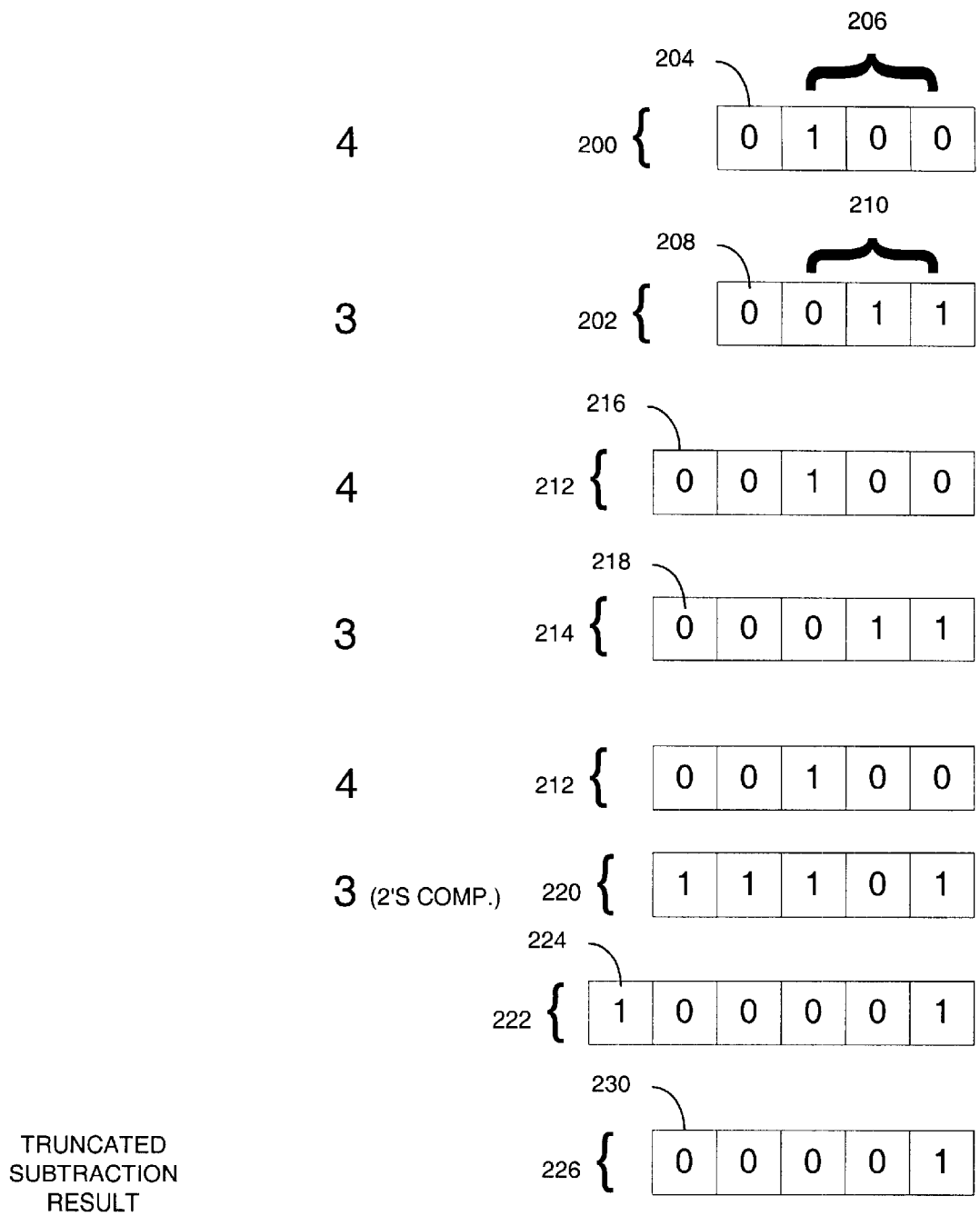

FIG. 8 shows another example according to one embodiment of the present invention. FIG. 8 illustrates a first number 4 and a second number 3 and the respective binary expressions 200, 202. The binary expression 200 includes a sign bit 204 with a value of "0" to indicate that the first number is a positive number, and a mantissa 206 that includes the value "100" (i.e. 4). Similarly, the binary expression 202 includes a sign bit 208 with a value of "0" to indicate the second number is a positive number, and a mantissa 210 that includes the value "011" (i.e. 3). Next, the binary expressions 200, 202 are sign extended one bit (bits 216, 218 respectively) to create extended binary expressions 212, 214. The sign extended second number 214 is then subtracted from the sign extended first number 212. As described above the subtraction is accomplished by adding the 2's complement 220 of the sign extended second number 214 to the sign extended first number 212. A subtraction result 122 is created. The subtraction result 222 includes an overflow bit 224 which is then truncated because the sign bits 204 and 208 are equal, to create a truncated subtraction result 226. The MSB of the truncated subtraction result 226 is not inverted because sign bits 204 and 208 are not BOTH equal to "1". The MSB 230 has the value of "0" which indicates that the first number (i.e., 4) is greater than or equal to the second number (i.e., 3), which is a true statement.

Figure 9:
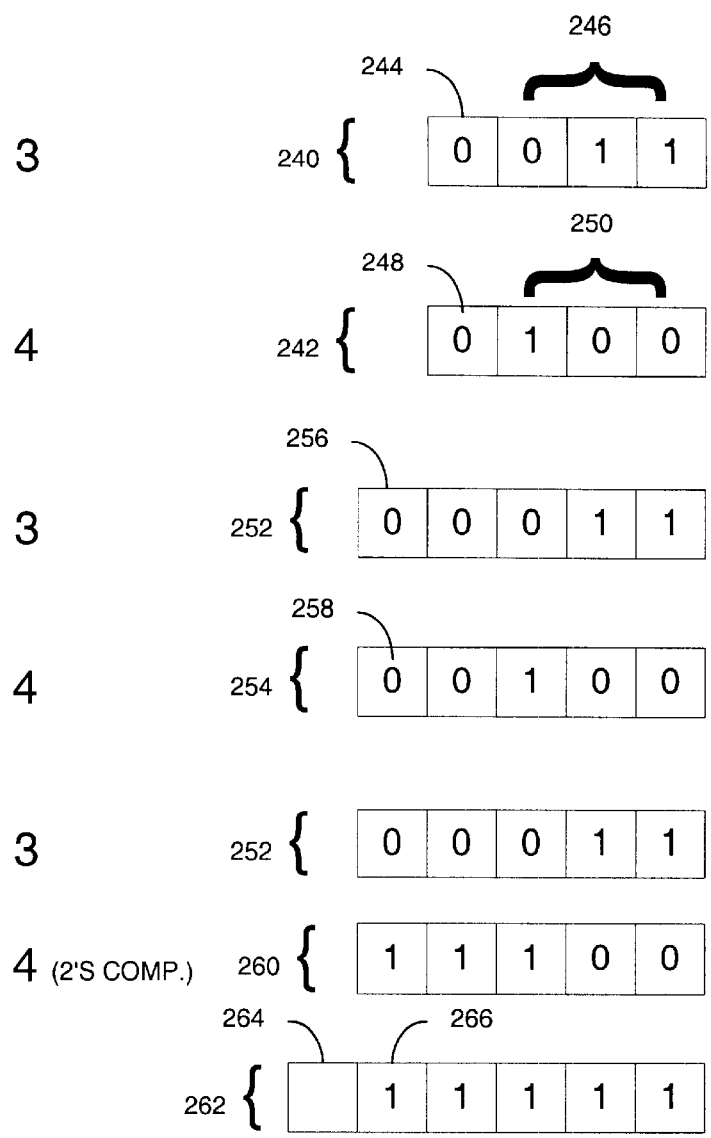

FIG. 9 shows another example according to one embodiment of the present invention. FIG. 9 illustrates a first number 3 and a second number 4 and the respective binary expressions 240, 242. The binary expression 240 includes a sign bit 244 with a value of "0" to indicate that the first number is a positive number, and a mantissa 246 that includes the value "011" (i.e. 3). Similarly, the binary expression 242 includes a sign bit 248 with a value of "0" to indicate that the second number is a positive number, and a mantissa 250 that includes the value "100" (i.e. 4). Next, the binary expressions 240, 242 are sign extended one bit (bits 256, 258 respectively) to create extended binary expressions 252, 254. The sign extended second number 254 is then subtracted from the sign extended first number 252. As described above the subtraction is accomplished by adding the 2's complement 260 of the sign extended second number 254 to the sign extended first number 252. A subtraction result 262 is created. The subtraction result 262 does not include an overflow bit 264, which is therefore not truncated even though the sign bits 244 and 248 are equal. The MSB 266 of the subtraction result 262 is not inverted because sign bits 244 and 248 are not BOTH equal to "1". The inverted MSB 266 has the value of "1" which indicates that the first number (i.e., 3) is less than the second number (i.e., 4), which is a true statement.

Those of ordinary skill in the art having the benefit of this disclosure would be readily aware of many different circuits that would accomplish the method of the present invention. For example, the method of the present invention may be implemented and performed in software, may be implemented and performed in hardware such as when using an application-specific integrated circuit, or may be implemented in hardware which is controlled by software.

Those skilled persons would also be readily aware that the present invention accommodates binary numbers having different widths. For example, pairs of 4-bit, 8-bit, 16-bit, 32-bit or 64-bit or wider numbers may be compared using the present invention.

It will be further appreciated that the instructions represented by the operations in FIGS. 2 and 3 are not required to be performed in the order illustrated, and that all the processing represented by the operations may not be necessary to practice the invention. Further, the processes described in FIGS. 2 and 3 can also be implemented in software stored in any one of or combinations of a RAM, a ROM, a hard disk drive or other storage medium that a computer may execute.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for comparing two floating point binary numbers comprising:

choosing a first floating point number and a second floating point number to be compared;

sign extending the first number one bit to create a first sign extended number;

sign extending the second number one bit to create a second sign extended number;

subtracting the second sign extended number from the first sign extended number to determine a subtraction result;

determining if the sign bits for said first number and said second number are both ones;
  if the sign bits for the first number and the second number are both ones inverting the sign bit of the subtraction result to create a final result; and determining if the sign bit of the final result is a zero;
  if the sign bit of said final result is a zero, asserting that the first number is greater than or equal to the second number; and
  if the sign bit of the final result is a one, asserting that the first number is less than the second number.

2. The method of claim 1, wherein the first and second floating point binary numbers to be compared are in the form of a sign bit as a most significant bit and a magnitude in the remaining bits.

3. The method of claim 1, wherein subtracting the second sign extended number from the first sign extended number to determine a subtraction result includes:

determining a two's complement of the second sign extended number; and adding the two's complement of the second sign extended number to the first sign extended number.

4. The method of claim 3, wherein the subtraction result further includes:

truncating the subtraction result if the sign bit of the first number is equal to the sign bit of the second number and the subtraction result included an overflow bit, the truncated subtraction result being equal to the subtraction result having the overflow bit truncated.

5. A machine readable medium having stored thereon instructions to perform a method for comparing two floating point binary numbers comprising:

choosing a first floating point number and a second floating point number to be compared;

sign extending the first number one bit to create a first sign extended number;

sign extending the second number one bit to create a second sign extended number;

subtracting the second sign extended number from the first sign extended number to determine a subtraction result;

determining if the sign bits for said first number and said second number are both ones;
  if the sign bits for the first number and the second number are both ones inverting the sign bit of the subtraction result to create a final result; and determining if the sign bit of the final result is a zero;
  if the sign bit of said final result is a zero, asserting that the first number is greater than or equal to the second number; and
  if the sign bit of the final result is a one, asserting that the first number is less than the second number.

6. The machine readable medium of claim 5, wherein the first and second floating point binary numbers to be compared are in the form of a sign bit as a most significant bit and a magnitude in the remaining bits.

7. The machine readable medium of claim 5, wherein subtracting the second sign extended number from the first sign extended number to determine a subtraction result includes:

determining a two's complement of the second sign extended number; and adding the two's complement of the second sign extended number to the first sign extended number.

8. The machine readable medium of claim 7, wherein the subtraction result further includes:

truncating the subtraction result if the sign bit of the first number is equal to the sign bit of the second number and the subtraction result included an overflow bit, the truncated subtraction result being equal to the subtraction result having the overflow bit truncated.

* * * * *